United States Patent
Ting

(10) Patent No.: US 7,209,207 B2
(45) Date of Patent: Apr. 24, 2007

(54) FLAT PANEL DISPLAY AND DRIVE CHIP THEREOF

(75) Inventor: Chin Lung Ting, Tainan County (TW)

(73) Assignee: Chi Mei Optoelectronics Corp. (TW)

( * ) Notice: Subject to any disclaimer, the term of this patent is extended or adjusted under 35 U.S.C. 154(b) by 611 days.

(21) Appl. No.: 10/189,436

(22) Filed: Jul. 8, 2002

(65) Prior Publication Data
US 2003/0080953 A1    May 1, 2003

(30) Foreign Application Priority Data
Oct. 31, 2001    (TW) .............................. 90127361 A

(51) Int. Cl.
*G02F 1/1345*     (2006.01)
(52) U.S. Cl. ...................... 349/149; 349/150; 349/151; 349/152; 257/200; 257/17
(58) Field of Classification Search ........ 349/149–152; 257/200, 17
See application file for complete search history.

(56) References Cited

U.S. PATENT DOCUMENTS

| | | | |
|---|---|---|---|
| 5,402,255 A | | 3/1995 | Nakanishi et al. ............. 359/88 |
| 5,407,864 A | * | 4/1995 | Kim .............................. 29/834 |
| 5,680,191 A | * | 10/1997 | Voisin et al. ................ 349/150 |
| 5,680,192 A | * | 10/1997 | Burrell et al. ............... 349/152 |
| 6,191,471 B1 | * | 2/2001 | Tamai et al. ................. 257/678 |
| 6,194,960 B1 | * | 2/2001 | Nagumo ...................... 327/565 |
| 6,300,997 B1 | * | 10/2001 | Saito et al. .................. 349/149 |
| 6,556,268 B1 | * | 4/2003 | Lee et al. .................... 349/149 |
| 6,660,626 B1 | * | 12/2003 | Lin ............................. 438/618 |
| 6,678,028 B2 | * | 1/2004 | Yamate et al. ............... 349/151 |
| 2001/0024259 A1 | * | 9/2001 | Song et al. .................. 349/149 |
| 2002/0008795 A1 | * | 1/2002 | Koyama et al. .............. 349/42 |
| 2002/0071085 A1 | * | 6/2002 | Huang et al. ................ 349/149 |
| 2002/0075422 A1 | * | 6/2002 | Yanagawa et al. .......... 349/155 |
| 2002/0185704 A1 | * | 12/2002 | Akram ........................ 257/459 |
| 2002/0196405 A1 | * | 12/2002 | Colgan et al. ............... 349/187 |
| 2003/0117557 A1 | * | 6/2003 | Fujita et al. ................. 349/139 |
| 2003/0147020 A1 | * | 8/2003 | Takahahsi et al. ............. 349/43 |
| 2003/0201462 A1 | * | 10/2003 | Pommer et al. ............. 257/200 |
| 2004/0032019 A1 | * | 2/2004 | Liu et al. ..................... 257/688 |
| 2004/0120659 A1 | * | 6/2004 | Cheng et al. .................. 385/89 |
| 2004/0159833 A1 | * | 8/2004 | Rueckes et al. .............. 257/17 |
| 2005/0007329 A1 | * | 1/2005 | Hiroki et al. ................. 345/92 |

\* cited by examiner

*Primary Examiner*—Michael G. Lee
*Assistant Examiner*—Allyson N Trail

(57) ABSTRACT

A flat panel display mainly includes a display panel and a plurality of drive IC chips mounted on the display panel by a chip-on-glass method. The display panel includes a plurality of electrode terminals, a plurality of external terminals and a plurality of first conductive traces. One surface of each drive IC chip is provided with a plurality of output terminals, a plurality of input terminals and a plurality of second conductive traces. The flat panel display is characterized in that corresponding input terminals on adjacent drive IC chips are electrically connected to one another through the first conductive traces of the display panel and the second conductive traces of the drive IC chips.

19 Claims, 4 Drawing Sheets

FLAT PANEL DISPLAY AND DRIVE CHIP THEREOF

CROSS REFERENCE

This claims priority from Taiwan Patent Application No. 090127361 filed on Oct. 31, 2001, incorporated herein by reference in its entirety.

BACKGROUND OF THE INVENTION

1. Field of the Invention

The present invention relates to a flat panel display (FPD) in which a drive integrated circuit (IC) chip is mounted onto a display panel by a chip-on-glass (COG) method. The present invention also relates to a drive IC chip for a flat panel display.

2. Description of the Related Art

For small size and low power consumption, flat panel display devices such as LCD (Liquid Crystal Display), PDP (Plasma Display Panel), ELD (Electroluminescent Display), and VFD (Vacuum Fluorescent Display) have been introduced. In these flat panel display devices, the LCD has been most widely adopted nowadays because of good picture quality and low power consumption. Although portable televisions and notebook computers having the LCD have been marketed, there are various problems yet to be solved.

In an LCD, packaging techniques for connecting a drive IC chip, which provides a drive signal to the LCD panel, include wire bonding (WB), tape automated bonding (TAB) and chip-on-glass (COG) methods. In these packaging techniques, the chip-on-glass (COG) method has been most actively researched recently because it can increase the density of the liquid crystal display element and minimize external size of the LCD in spite of various disadvantages.

However, when a plurality of integrated circuit chips are mounted on one surface of a glass substrate, a wide area is required to wire the bus lines for transmitting the common signals such as power supply and data signal between the chips. This greatly reduces the available area of the surface of the glass substrate. Typically, the bus lines are formed from the conductive layers such as ITO (Indium Tin Oxide) layer on the substrate thereby significantly increasing the resistance of the bus lines.

U.S. Pat. No. 5,402,255, issued on Apr. 3, 1995 to Nakanishi et al., discloses a device utilizing the internal circuits of drive IC chips to transmit the common signals between the chips. Referring to FIG. 1, Nakanishi et al. disclose a drive chip 100 having output terminals 110 for providing drive signals to an LCD panel. The left-hand and right-hand terminals 120 and 130 for input and output signals are connected to each other through an internal circuit 140 of the chip 100. Typically, the internal circuit of IC chip is made of aluminum alloy. Although aluminum alloy has higher electrical conductivity as compared with ITO, the problems of signal distortion or voltage (or IR) drop are still observed. Furthermore, when extra metal traces are built into the architecture of a chip, the manufacturing process of wafer becomes complicated thereby increasing the production cost.

SUMMARY OF THE INVENTION

It is an object of the present invention to provide a compact and highly reliable flat panel display with drive IC chips directly mounted on its glass substrate.

It is another object of the present invention to provide a flat panel display which overcomes the problems of signal distortion or voltage (or IR) drop due to the electrical resistance of wiring connected between drive IC chips mounted on the panel.

It is still another object of the present invention to provide a drive IC chip for a flat panel display wherein one surface of the drive IC chip is provided with output/input terminals and conductive traces for establishing electric connection with another drive IC chip.

To achieve the above listed and other objects, the present invention provides a flat panel display mainly comprising a display panel and a plurality of drive IC chips mounted on the display panel by a chip-on-glass method. The display panel includes a plurality of electrode terminals for receiving drive signals, a plurality of external terminals and a plurality of first conductive traces. One surface of each drive IC chip is provided with a plurality of output terminals, a plurality of input terminals and a plurality of second conductive traces. The output terminals are electrically connected to the electrode terminals of the display panel for transmitting drive signals. The input terminals are electrically connected to the external terminals of the display panel for receiving a common signal to control the drive IC chips. The flat panel display is characterized in that corresponding input terminals on adjacent drive IC chips are electrically connected to one another through the first conductive traces of the display panel and the second conductive traces of the drive IC chips. Each of the drive IC chips has a plurality of metal bumps such as gold bumps formed on the output terminals thereof, and the second conductive traces on each drive IC chip are made of the same material, i.e., gold that forms the metal bumps.

It is noted that signals are transmitted between the drive IC chips mounted on the panel mainly through the second conductive traces of gold. This significantly reduces the problems of signal distortion or voltage (or IR) drop due to the electrical resistance of wiring, since gold has an excellent electrical conductivity as compared to conventional aluminum alloy or ITO. Therefore, a reliable flat panel display is obtained. Furthermore, the use of the second conductive traces on the chips enables the space required to wire the bus lines to be reduced thereby further reducing the overall size of the obtained flat panel display.

To achieve the above listed and other objects, the present invention further provides a drive integrated circuit chip having opposing first and second edges for a flat panel display. One surface of the drive integrated circuit chip is provided with a plurality of output terminals, a plurality of input terminals and a plurality of second conductive traces. The input terminals are arranged along the first edge, and the second conductive traces comprise at least one lead having a first end portion formed on one of the input terminals and a second end portion formed corresponding to the second edge of the drive IC chip. In this embodiment, only the output terminals have metal bumps provided thereon, and the protruding height of the second conductive traces is substantially the same as the protruding height of the metal bumps. The first end portion and the second end portion of the lead are attached to the first conductive traces of the display panel by an anisotropic conductive adhesive film (ACF) such that the first end portion and the second end portion are electrically coupled to the first conductive traces, respectively; meanwhile, the metal bumps on the output terminals are attached to the electrode terminals of the display panel by the same ACF such that the metal bumps are electrically coupled to the electrode terminals for transmitting drive signals.

According to another embodiment of the present invention, the drive IC chip further comprises at least one dummy pad arranged along the first edge of the drive IC chip. The second conductive traces comprise at least one lead having a first end connected to one of the input terminals and a second end connected to the dummy pad. In this embodiment, the input/output terminals and the dummy pad have metal bumps provided thereon, and the protruding height of the conductive traces is substantially lower than the protruding height of the metal bumps. The metal bumps on the input terminals and the dummy pad are attached to the first conductive traces of the display panel by an anisotropic conductive adhesive film (ACF) such that the metal bumps are electrically coupled to the first conductive traces; meanwhile, the metal bumps on the output terminals are attached to the electrode terminals of the display panel by the same ACF such that the metal bumps are electrically coupled to the electrode terminals for transmitting drive signals.

According to the drive IC chip of the present invention, the second conductive traces and the gold bumps are both formed by conventional methods on the backside surface of the drive IC chip, thereby simplifying the manufacturing process of wafer and reducing the production cost.

BRIEF DESCRIPTION OF THE DRAWINGS

Other objects, advantages, and novel features of the invention will become more apparent from the following detailed description when taken in conjunction with the accompanying drawings.

DETAILED DESCRIPTION OF THE PREFERRED EMBODIMENTS

The flat panel display according to an embodiment of the present invention mainly comprises a display panel and a plurality of drive IC chips mounted on the display panel by a chip-on-glass (COG) method. The flat panel display of the present invention is characterized in that corresponding input terminals on adjacent drive IC chips are electrically connected to one another through the conductive traces formed on the display panel as well as the drive IC chips.

Figure 1:
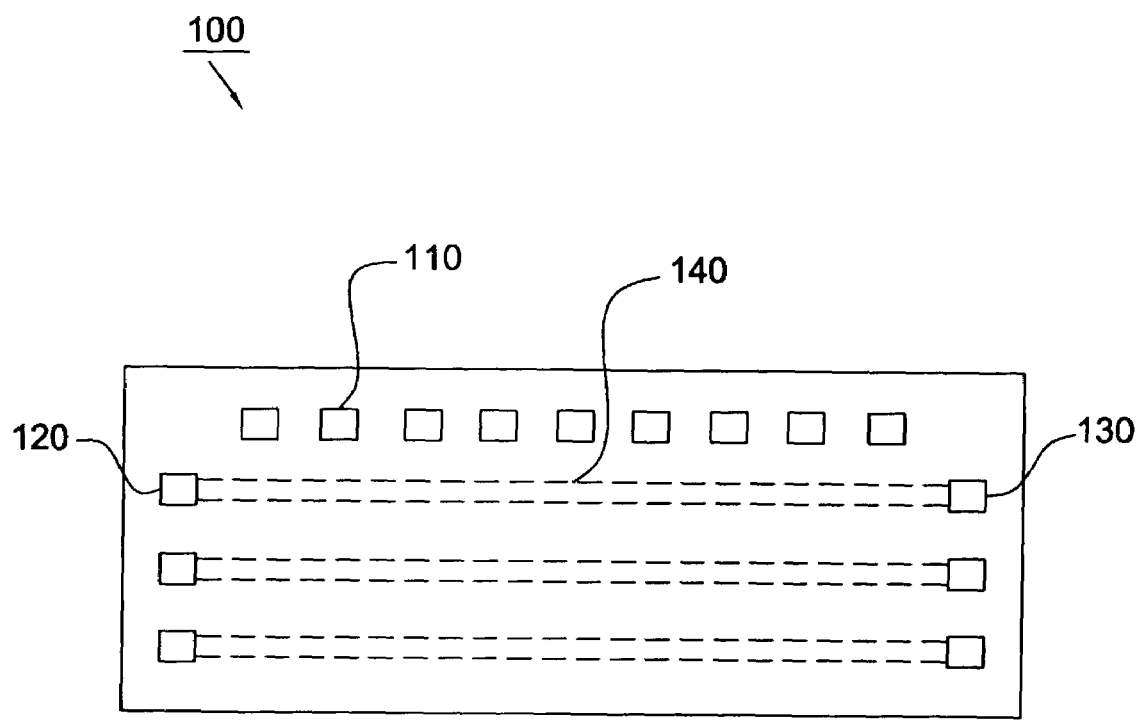
FIG. 1 is a bottom plan view of a conventional drive IC chip.
Figure 2:
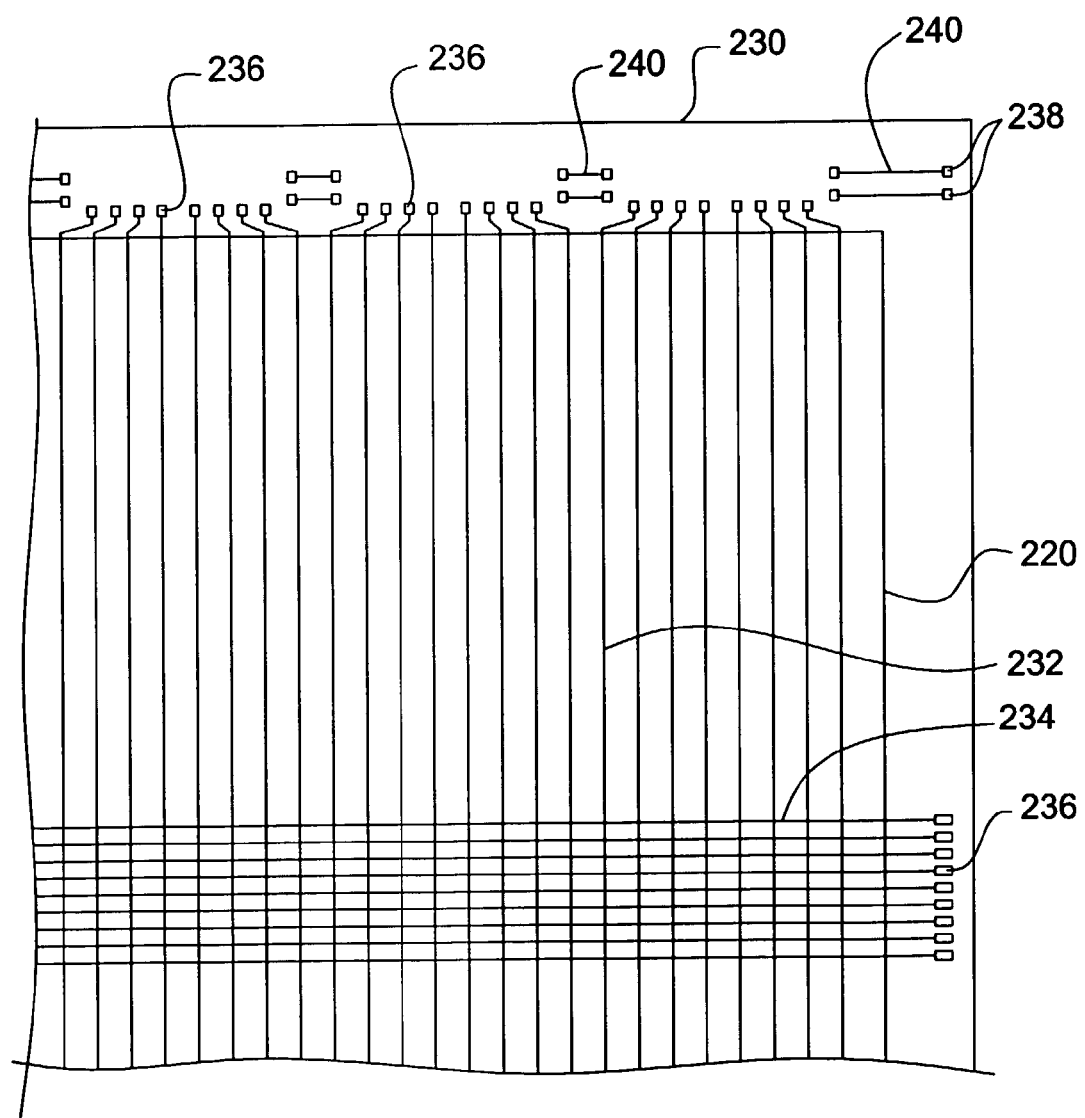
FIG. 2 is a top plan view of a portion of a display panel according to an embodiment of the present invention.

FIG. 2 is a top plan view of a portion of a display panel 210 according to an embodiment of the present invention. The display panel 210 mainly comprises a top plate 220 and a bottom plate 230 bonded to the top plate 220. On the central region of the bottom plate 230, there are formed a plurality of parallel scan lines 232 and a plurality of parallel data lines 234 perpendicular to the scan lines 232. Although not shown, these scan lines 232 and data lines 234 are insulated from each other through an inter-layer insulating film. Moreover, the display region is constructed within the region in which the scan lines 232 and the data lines 234 intersect, and the pixel region is a region which is surrounded by the two adjacent scan lines 232 and the two adjacent data lines 234. Specifically, in each pixel region, there are formed a thin film transistor (TFT) as the switching element, and a pixel electrode (not shown). It could be understood that the top plate 220 may be a color filter (CF) substrate, and the bottom plate 230 may be a thin film transistor (TFT) substrate.

As shown in FIG. 2, the scan lines 232 and data lines 234 of the present invention have one ends forming the electrode terminals 236 adapted for connecting to drive ICs. The bottom plate 230 further includes external terminals 238 and first conductive traces 240. The external terminals 238 are designed to be connected to an input device such as a data clock controller (not shown) for input common signals such as power supply, data signal, clock signal and address signal (chip select). Although the first conductive traces 240 are simply illustrated as parallel lines in FIG. 2, they may be arranged in other patterns. The first conductive traces 240 are formed by patterning on the bottom plate 230 at locations corresponding to the portion in which the drive IC chips will be mounted.

Figure 3:
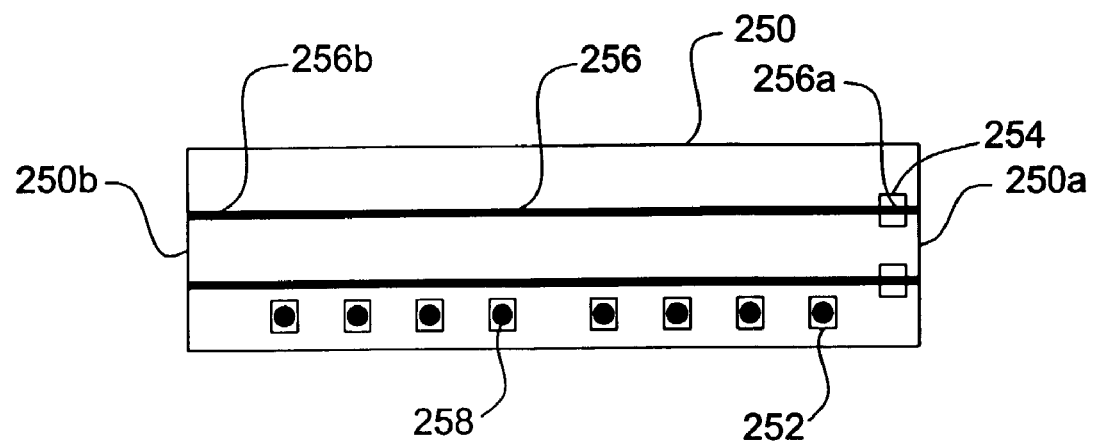
FIG. 3 is a bottom plan view of a drive IC chip according to a first embodiment of the present invention.

FIG. 3 shows a drive IC chip 250 according to a first embodiment of the present invention. The drive chip 250 has two opposing longer edges, two opposing shorter edges and two opposing surfaces. One surface of the drive chip 250 is provided with a plurality of output terminals 252, a plurality of input terminals 254 and a plurality of second conductive traces. The output terminals 252 are arranged along the longer edge for output drive signals. The input terminals 254 are arranged along the shorter edge 250a for input signals common to the drive integrated circuits. The second conductive traces 256 comprise two leads 256 having first end portions 256a formed on the input terminals 254 and second end portions 256b formed corresponding to the other shorter edge 250b of the drive chip 250. In this embodiment, only the output terminals 252 have metal bumps 258 provided thereon. The metal bumps 258 may be formed by a conventional bumping technology comprising the steps of: (a) forming an under bump metallurgy (UBM) on the output terminals 252 of the drive chip 250 by, e.g., electroless nickel/gold plating, and (b) forming metal bumps on the UBM by, e.g., vapor deposition, electroplating or printing. Preferably, the metal bump 258 is a gold bump with at least about 90 weight percentage of Au. Typically, the gold bump is formed by the following steps: (a) Application of a photoresist on the drive chip 250 and its patterning to form opening at a location corresponding to the output terminal 252; and (b) Electrodeposition of gold on the resist opening section to form the gold bump. It is noted that the second conductive traces of the present invention can be formed using the conventional process described above without introducing any additional step. That is accomplished by transferring a predetermined pattern having the design of the second conductive traces integrated therein during the step (a), and plating a layer of gold on the exposed area of the second conductive traces to form the leads 256 during the step (b). Preferably, the protruding height of the conductive traces, i.e., the leads 256, is substantially the same as the protruding height of the metal bumps 258.

Figure 5:
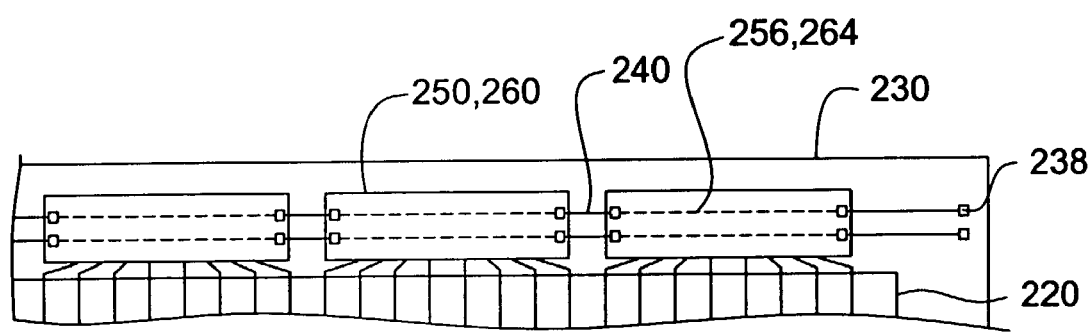
FIG. 5 is a top plan view of a portion of a flat panel display according to an embodiment of the present invention illustrating several drive IC chips mounted on the display panel of FIG. 2.

Referring to FIG. 5, the drive IC chips 250 are mounted on the bottom plate 230 of the display panel by a COG method. Specifically, although not shown in FIG. 5, the chip 250 is attached to the bottom plate 230 of the display panel by an anisotropic conductive adhesive film (ACF). One type of anisotropic adhesive suitable for forming the ACF is known as a "z-axis anisotropic adhesive". Z-axis anisotropic adhesives are filled with conductive particles to a low level such that the particles do not contact each other in the xy plane. Accordingly, compression of the material in the z direction establishes an electrical path. Therefore, the output terminals 252 are electrically connected to the electrode terminals (not shown in FIG. 5) of the display panel for transmitting drive signals through the metal bumps 258 and the conductive particles of ACF. Referring to FIG. 3 and FIG. 5, the common signals are input to the display panel through the external terminals 238 and are transmitted to the input terminals 254 of a drive chip 250 through the first conductive trace 240, the first end portions 256a of the leads 256 and the conductive particles of ACF. Then, the common signals are transmitted through the leads 256 (as shown by the dotted lines in FIG. 5) to the second end portions 256b thereof. Thereafter, the common signals are output to the input terminals 254 of another drive chip 250 from the second end portions 256b. In this way, corresponding input terminals 254 on adjacent drive IC chips are electrically connected to one another through the first conductive traces 240 of the display panel and the second conductive traces on the surface of the drive IC chips.

Figure 4:
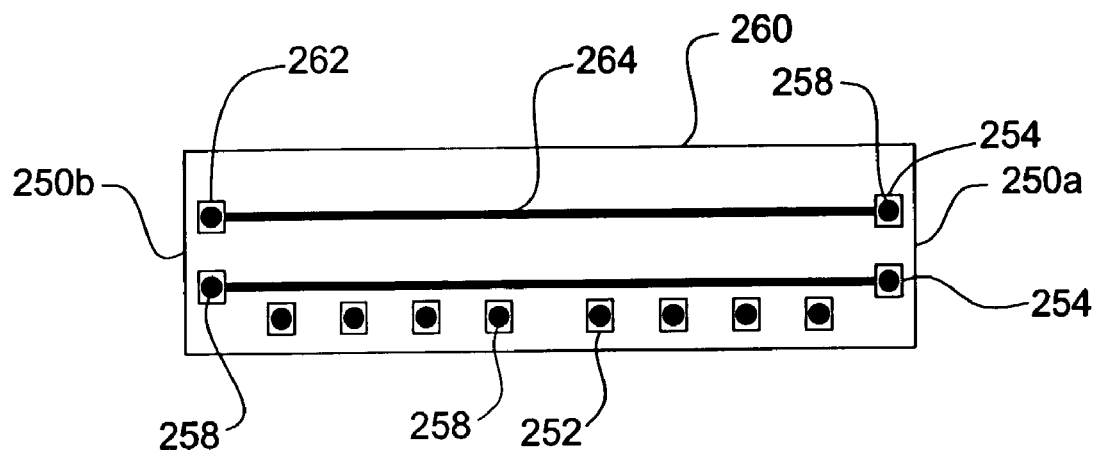
FIG. 4 is a bottom plan view of a drive IC chip according to a second embodiment of the present invention.

FIG. 4 shows a drive IC chip 260 according to a second embodiment of the present invention. The drive chip 260 is characterized by the feature of further comprising two dummy pads 262 arranged along the shorter edge 250b thereof. The second conductive traces comprise two leads 264 having first ends connected to the input terminals 254 and second ends connected to the dummy pads 262. It is noted that the dummy pads 262, the output terminals 252, the input terminals 254 and the second conductive traces are formed on the same surface. The structure of the dummy pads 262 is substantially the same as the structure of the input/output terminals 252, 254 with the exception that the dummy pads 262 are not electrically connected to the inner circuit of chip. In this embodiment, the input/output terminals 252, 254 and the dummy pads 262 have metal bumps 258 provided thereon. Preferably, the protruding height of the conductive traces, i.e., the leads 256, is substantially lower than the protruding height of the metal bumps 258 such that the area on the bottom plate 230 for mounting the drive chips can be utilized for other wiring.

Referring to FIG. 5, the drive IC chips 260 may be attached to the bottom plate 230 of the display panel by an ACF, too. Therefore, the input terminals 254 and the dummy pads 262 (see FIG. 4) are electrically connected to the first conductive traces 240 of the display panel through the metal bumps 258 and the conductive particles of ACF. In this embodiment, the common signals input to the external terminals 238 are transmitted to the input terminals 254 of a drive chip 260 through the first conductive trace 240, the metal bump 258 and the conductive particles of ACF. Then, the common signals are transmitted through the leads 264 (as shown by dotted lines in FIG. 5) to the dummy pads 262. Thereafter, the common signals are output to the input terminals 254 of another drive chip 260 from the dummy pads 262. In this way, corresponding input terminals 254 on adjacent drive IC chips are electrically connected to one another through the first conductive traces 240 of the display panel and the second conductive traces on the surface of the drive IC chips.

According to the drive IC chip of the present invention, the second conductive traces and the gold bumps are both formed by conventional methods on the backside surface of the drive IC chip, thereby simplifying the manufacturing process of wafer and reducing the production cost. In addition, since gold has an excellent electrical conductivity as compared to conventional aluminum alloy or ITO, the problems of signal distortion or voltage (or IR) drop due to the electrical resistance of wiring are significantly reduced, thereby obtaining a reliable flat panel display. Furthermore, the use of the second conductive traces on the chips enables the space required to wire the bus lines to be significantly reduced thereby further reducing the overall size of the obtained flat panel display.

Although the preferred embodiments in the present invention are explained by means of liquid crystal displays of the COG type, it is specifically contemplated that the present invention is widely applicable to various flat panel displays with drive chips mounted by COG methods, including, but not limited to, PDP (Plasma Display Panel), ELD (Electroluminescent Display), OLED panel and VFD (Vacuum Fluorescent Display).

Although the invention has been explained in relation to its preferred embodiment, it is to be understood that many other possible modifications and variations can be made without departing from the spirit and scope of the invention as hereinafter claimed.

What is claimed is:

1. A flat panel display comprising:
a display panel including a plurality of electrode terminals for receiving drive signals, a plurality of external terminals and a plurality of first conductive traces; and
a plurality of drive IC chips mounted on the display panel by a chip-on-glass method, each of the drive IC chips having a plurality of output terminals, a plurality of input terminals and a plurality of second conductive traces provided on a surface thereof, the output terminals being electrically connected to the electrode terminals of the display panel, the input terminals being electrically connected to the external terminals of the display panel for receiving a common signal to control the drive IC chips,
wherein corresponding input terminals on adjacent drive IC chips are electrically connected to one another through the first conductive traces of the display panel and the second conductive traces of the drive IC chips.

2. The flat panel display as claimed in claim 1, wherein the surface of each drive IC chip has opposing first and second edges, the input terminals are arranged along the first edge of the drive IC chip, and the second conductive traces on the drive IC chip comprise at least one lead having a first end portion formed on one of the input terminals and a second end portion formed corresponding to the second edge of the drive IC chip.

3. The flat panel display as claimed in claim 2, wherein each of the drive IC chips has a plurality of metal bumps formed on the output terminals thereof, and the second conductive traces on each drive IC chip are made of the same material that forms the metal bumps.

4. The flat panel display as claimed in claim 3, wherein a protruding height of the second conductive traces is substantially the same as the protruding height of the metal bumps, and the first end portion and the second end portion of the lead are attached to the first conductive traces of the display panel through an anisotropic conductive adhesive film (ACF) such that the first end portion and the second end portion are electrically coupled to the first conductive traces, respectively.

5. The flat panel display as claimed in claim 1, wherein the surface of each drive IC chip has opposing first and second edges, each drive IC chip further comprises at least one dummy pad arranged along the first edge of the drive IC chip, the input terminals are arranged along the second edge of the drive IC chip, and the second conductive traces comprise at least one lead having a first end connected to one of the input terminals and a second end connected to the dummy pad.

6. The flat panel display as claimed in claim 5, wherein each of the drive IC chips has a plurality of metal bumps formed on the output terminals, the input terminals and the dummy pads, and the second conductive traces on each drive IC chip are made of the same material that forms the metal bumps.

7. The flat panel display as claimed in claim 6, wherein a protruding height of the second conductive traces is substantially lower than the protruding height of the metal bumps.

8. The flat panel display as claimed in claim 1, wherein the display panel is a liquid crystal display panel comprising a top plate and a bottom plate bonded to the top plate, the bottom plate is provided with a plurality of parallel scan lines and a plurality of parallel data lines perpendicular to the scan lines, wherein the electrode terminals for receiving drive signals are formed as part of the scan lines or the data lines.

9. The flat panel display as claimed in claim 1, wherein
the second conductive traces on each drive IC chip comprise at least one lead having a first end portion formed on one of the input terminals and a second, opposite end portion;
each of the drive IC chips has a plurality of metal bumps formed on the output terminals thereof; and
a protruding height of the second conductive traces is substantially the same as the protruding height of the metal bumps.

10. The flat panel display as claimed in claim 1, wherein
each drive IC chip further comprises at least one dummy pad on said surface, and the second conductive traces comprise at least one lead having a first end connected to one of the input terminals and a second end connected to the dummy pad;
each of the drive IC chips has a plurality of metal bumps formed on the output terminals, the input terminals and the dummy pads; and
a protruding height of the second conductive traces is substantially lower than the protruding height of the metal bumps.

11. The flat panel display as claimed in claim 1, wherein each of the second conductive traces is an elongated conductive trace.

12. The flat panel display as claimed in claim 1, wherein each of the second conductive traces is an elongated conductive trace having opposite ends positioned adjacent opposite edges of the corresponding drive IC chip.

13. The flat panel display as claimed in claim 1, wherein the corresponding input terminals of each pair of adjacent said drive IC chips are serially electrically connected by one of said first conductive traces and one of said second conductive traces.

14. The flat panel display as claimed in claim 13, wherein the corresponding input terminals of more than two said drive IC chips are serially electrically connected by said first and second conductive traces to one of said external terminals of said display panel for receiving said common signal.

15. The flat panel display as claimed in claim 13, wherein
each of the second conductive traces is an elongated conductive trace and has opposite first and second end portions, said first end portion defining one of the input terminals of the corresponding drive IC chip and said second end portion being electrically connected to the corresponding input terminal of an adjacent drive IC chip via one of said first conductive traces; and
said one of said first conductive traces also has opposite end portions physically bonded and electrically connected to said second end portion of said second elongated conductive trace and the corresponding input terminal of said adjacent drive IC chip, respectively.

16. A drive integrated circuit chip for a flat panel display, the drive integrated circuit chip comprising a plurality of output terminals, a plurality of input terminals and a plurality of conductive traces provided on a surface thereof, the conductive traces comprising at least one lead having a first end portion formed on one of the input terminals;
wherein the surface has opposing first and second edges, the input terminals are arranged along the first edge, and the lead having a second end portion formed corresponding to the second edge.

17. A drive integrated circuit chip for a flat panel display, the drive integrated circuit chip comprising a plurality of output terminals, a plurality of input terminals and a plurality of conductive traces provided on a surface thereof, the conductive traces comprising at least one lead having a first end portion formed on one of the input terminals;
said drive integrated circuit chip further comprising a plurality of metal bumps formed on the output terminals, and the conductive traces are made of the same material that forms the metal bumps.

18. The drive integrated circuit chip as claimed in claim 17, wherein a protruding height of the conductive traces is substantially the same as the protruding height of the metal bumps.

19. A drive integrated circuit chip for a flat panel display, the drive integrated circuit chip comprising a plurality of output terminals, a plurality of input terminals and a plurality of conductive traces provided on a surface thereof, the conductive traces comprising at least one lead having a first end portion formed on one of the input terminals;
said drive integrated circuit chip further comprising a plurality of metal bumps formed on the output terminals, wherein a protruding height of the conductive traces is substantially the same as the protruding height of the metal bumps.

* * * * *